United States Patent
Kwon et al.

(10) Patent No.: US 7,272,103 B2
(45) Date of Patent: Sep. 18, 2007

(54) LASER POWER MONITOR DEVICE, OPTICAL PICKUP INCLUDING THE SAME, AND OPTICAL RECORDING AND/OR REPRODUCING APPARATUS INCLUDING THE SAME

(75) Inventors: Sung-du Kwon, Seoul (KR); Jun-hyuk Lee, Suwon-si (KR); Pyong-yong Seong, Seoul (KR); Hyun-cheal Bang, Suwon-si (KR); Jong-koog Lee, Seoul (KR); Yong-jun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 537 days.

(21) Appl. No.: 10/751,647

(22) Filed: Jan. 6, 2004

(65) Prior Publication Data

US 2005/0002303 A1    Jan. 6, 2005

(30) Foreign Application Priority Data

Jan. 7, 2003    (KR) .................... 10-2003-0000774

(51) Int. Cl.
*G11B 7/00* (2006.01)
(52) U.S. Cl. .................................... 369/116
(58) Field of Classification Search ................ 369/116, 369/47.1, 47.5, 47.51, 47.52, 47.53, 121, 369/122, 120
See application file for complete search history.

(56) References Cited

U.S. PATENT DOCUMENTS 4,721,850 A    1/1988  Sakai et al.
5,233,175 A    8/1993  Latta et al.
6,061,317 A *  5/2000  Shodo .................... 369/53.26
6,445,670 B1 * 9/2002  Oshima .................... 369/116
6,734,793 B1 * 4/2004  Nagara .................... 372/38.02

FOREIGN PATENT DOCUMENTS

KR    2001-33629    4/2001

OTHER PUBLICATIONS

Notice of Office Action issued by Korean Patent Office on Nov. 22, 2004 and English translation thereof.
First Office Action dated Aug. 4, 2006 issued in the corresponding Chinese Application No. 200410005092.9.

* cited by examiner

*Primary Examiner*—Nabil Hindi
(74) *Attorney, Agent, or Firm*—Staas & Halsey LLP

(57) ABSTRACT

In order to improve the frequency characteristic of a laser power monitor device and the precision of laser power control when low-speed recording is performed, there is provided a laser power monitor device for an optical recording and/or reproducing apparatus, the laser power monitor device including a photo diode unit to receive part of a light emitted from a laser diode and output a current proportional to optical power, and a monitor circuit to receive the current output from the photo diode unit, convert the received current into a voltage, and outputs the voltage to an automatic laser power control circuit, and the photo diode unit includes a plurality of photo diodes connected to the monitor circuit to supply current to the monitor circuit. The laser power monitor device further includes a switch unit, wherein the switch unit is located between the photo diode unit and the monitor circuit to receive a signal on a current recording speed and switch so that the number of photo diodes supplying current to the monitor circuit is reduced as the recording speed is increased.

10 Claims, 4 Drawing Sheets

US 7,272,103 B2

LASER POWER MONITOR DEVICE, OPTICAL PICKUP INCLUDING THE SAME, AND OPTICAL RECORDING AND/OR REPRODUCING APPARATUS INCLUDING THE SAME

CROSS-REFERENCE TO RELATED APPLICATIONS

This application claims the priority of Korean Patent Application No. 2003-774, filed on Jan. 7, 2003, in the Korean Intellectual Property Office, the disclosure of which is incorporated herein in its entirety by reference.

BACKGROUND OF THE INVENTION

1. Field of the Invention

The present invention relates to a laser power monitor device, and more particularly, to a laser power monitor device for an optical recording and/or reproducing apparatus, capable of precisely controlling the power of a laser diode during a high speed or low speed operation of the optical recording and/or reproducing apparatus. The present invention also relates to an optical pickup including the laser power monitor device, and an optical recording and/or reproducing apparatus including the optical pickup.

2. Description of the Related Art

A laser diode is used as a light source in an optical pickup for an optical recording and/or reproducing apparatus, such as a CD player, a recordable CD-R drive, or an overwritable CD-RW drive. The power of the laser diode should be stable so that recording and/or reproducing of the optical recording and/or reproducing apparatus is performed smoothly. However, the power of the laser diode varies significantly with the operating temperature or period of use. Thus, power control should be performed in order to stabilize the power at an appropriate level. As such, a laser power control apparatus is provided to the optical pickup.

FIG. 1 shows a conventional laser power control apparatus. Reference numeral 10 denotes a photo diode 10 which receives part of the light emitted from a laser diode 40 and outputs a current proportional to an optical power of the laser. Reference numeral 20 denotes a monitor circuit, which is a current/voltage conversion circuit that receives the current output from the photo diode 10, converts the received current into a voltage, and outputs the voltage. A variable resistor for controlling the gain of the monitor circuit 20 is provided in the monitor circuit 20, and a value thereof is controlled in a process of manufacturing the optical recording and/or reproducing apparatus so that the monitor circuit 20 used in an optical recording and/or reproducing apparatus has a constant gain, that is, so that the monitor circuit 20 outputs the same voltage with respect to same current input.

Reference numeral 30 denotes an automatic laser power control circuit that receives an output voltage from the monitor circuit 20, compensates a difference between the output voltage and a predetermined reference voltage, and outputs a proper laser diode driving current.

The photo diode 10 and the monitor circuit 20 that convert power of a laser incident on the laser diode 40 into a voltage corresponding to the laser power, are referred to as a front photo detector. However, in the present specification, the photo diode 10 and the monitor circuit 20 are referred to as a laser power monitor device.

The maximum voltage that is received from the ALPC circuit 30 and can be processed is limited. As such, a voltage output from the laser power monitor device should be in the range of the maximum voltage. This should be considered when setting the gain of the monitor circuit 20.

FIG. 2 is a graph describing optical powers of a laser output from the laser diode in a pulse train system used in a CD-RW and DVD-RW recording apparatus. In a space section between pits, a laser at erase power level Pe is irradiated, and a recorded portion is erased. When recording pits in a mark section, a laser at peak power level Pp, which is a maximum power, and a laser at bias power level Pb, which is a minimum power, are alternately irradiated and the pits are recorded at fast speed. In order to properly heat dyes coated on an optical disc, an initial peak power section of the mark section is longer than the other sections. In accordance with the power input, output of the laser power monitor device ranges from the minimum voltage corresponding to the bias power level Pb to the maximum voltage corresponding to the peak power level Pp.

FIG. 2 shows part of a recording signal that indicates recording performed at a predetermined recording speed. In a recording mode of an actual optical recording and/or reproducing apparatus, a recording speed may be varied by a user's selection. Even when the recording speed is set to high speed, the optical recording and/or reproducing apparatus operates. When recording is performed at low speed, the rotational speed of an optical disc is lower than when recording is performed at high speed. In the case of high speed, recording should be performed with higher optical power. As such, the above-described power control should be performed depending on a recording speed.

FIG. 3 is a graph of laser driving current versus voltage output from a monitor circuit 20 in the conventional laser power control apparatus. When high-speed recording and low-speed recording is performed, the slope of the graph is the same, but the variation range of optical power is different. Thus, the variation range of laser driving current is different. As such, the variation range of a monitor circuit output voltage is different. In other words, in the case of low speed, the variation range of laser driving current and monitor circuit output voltage is smaller than the variation range of laser driving current and monitor circuit output voltage at high speed.

In addition, a reference voltage compared with an actual current voltage for output compensation is different for each speed. The reference voltage is low at low speed where low optical power is used. Optical power is proportional to the driving current inputted into a laser diode. Thus, similar graphs of the laser diode driving current and the monitor circuit output voltage can be obtained.

The ALPC circuit 30 tabulates and stores the relation between the laser diode driving current and the monitor circuit output voltage through a power calibration process during an initial operation of the optical recording and/or reproducing apparatus. When recording is performed, a difference between the output voltage of the monitor circuit 20 and a predetermined reference voltage is measured, and in order to compensate the difference, the laser diode driving current is increased or decreased.

The gain of the monitor circuit 20 is controlled and fixed at a constant level. Thus, in the case of high speed recording at which high optical power is outputted Pp current output from the photo diode 10 is large at the peak power level Pp. Thus, the voltage output from the monitor circuit 20 is high and has a wide range of variation. On the other hand, in the case of low speed recording at which low optical power is output, current output from the photo diode 10 is small at the peak power level Pp. Thus, the voltage output from the monitor circuit 20 is small and has a narrow range of variation.

However, during low speed recording in the conventional apparatus having the above structure, the precision of power control decreases as the variation range of the voltage output from the monitor circuit 20 and input into the ALPC circuit 30 decreases.

The maximum speed of the optical recording and/or reproducing apparatus has increased rapidly with the development of new recording and/or reproducing technologies. However, the maximum output voltage of the monitor circuit 20 is limited. Thus, as the maximum speed increases, the difference between the minimum speed and the maximum speed of the output voltage range of the monitor circuit 20 also increases. As such, lowering the precision of power control at low speed becomes more critical.

In the case of using one photo diode 10, the photo diode 10 should be large enough in order to obtain a sufficient output current. In such cases, the frequency characteristic of the output current is not good, and the variation of the output current cannot exactly follow a variation in optical power of laser incident on the photo diode 10.

SUMMARY OF THE INVENTION

The present invention provides a laser power monitor device capable of maintaining high precision of laser power control at low speed.

The present invention also provides a laser power monitor device capable of improving the frequency characteristic of current inputted into a monitor circuit.

According to an aspect of the present invention, there is provided a laser power monitor device for an optical recording and/or reproducing apparatus, the laser power monitor device comprising a photo diode unit, which receives part of light emitted from a laser diode and outputs a current proportional to optical power, and a monitor circuit, which receives the current output from the photo diode unit, converts the received current into a voltage, and outputs the voltage to an ALPC circuit, and the photo diode unit includes a plurality of photo diodes connected to the monitor circuit to supply current to the monitor circuit.

The device may further comprise a switch unit, additionally installed between the photo diode unit and the monitor circuit, which receives a signal on a current recording speed, and switches so that the number of photo diodes for supplying current to the monitor circuit is reduced as the recording speed is increased.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become more apparent, and more readily appreciated from the following description of the embodiments taken in conjunction with the accompanying drawings in which.

DETAILED DESCRIPTION OF THE PREFERRED EMBODIMENTS

Figure 1:
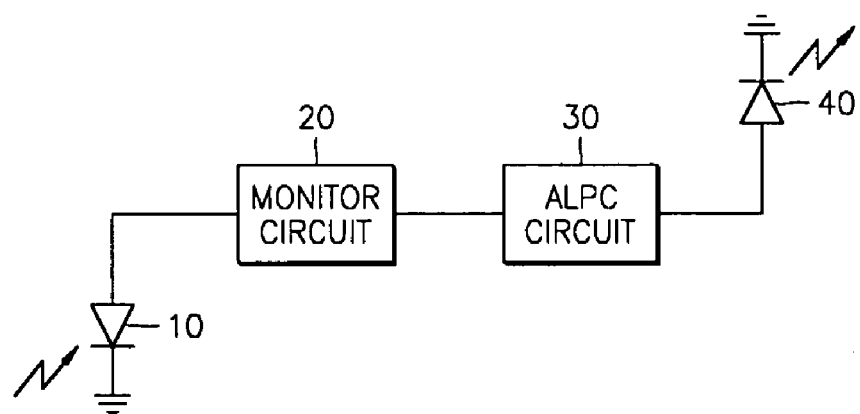
FIG. 1 illustrates a conventional laser power control apparatus.
Figure 2:
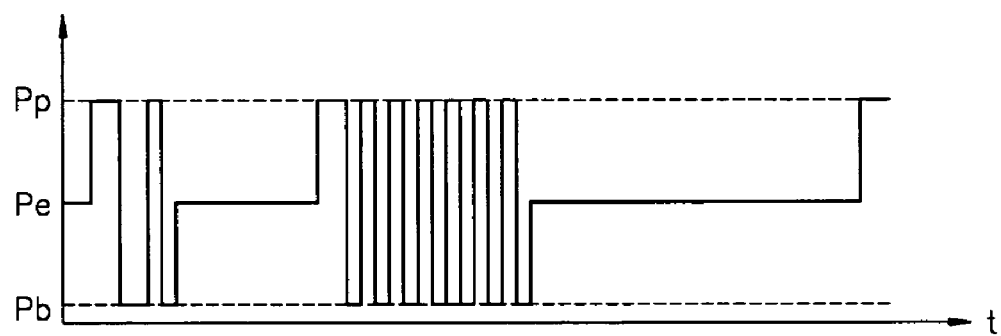
FIG. 2 is a graph illustrating optical power output from a laser diode in a pulse train system in the conventional laser power control apparatus.
Figure 3:
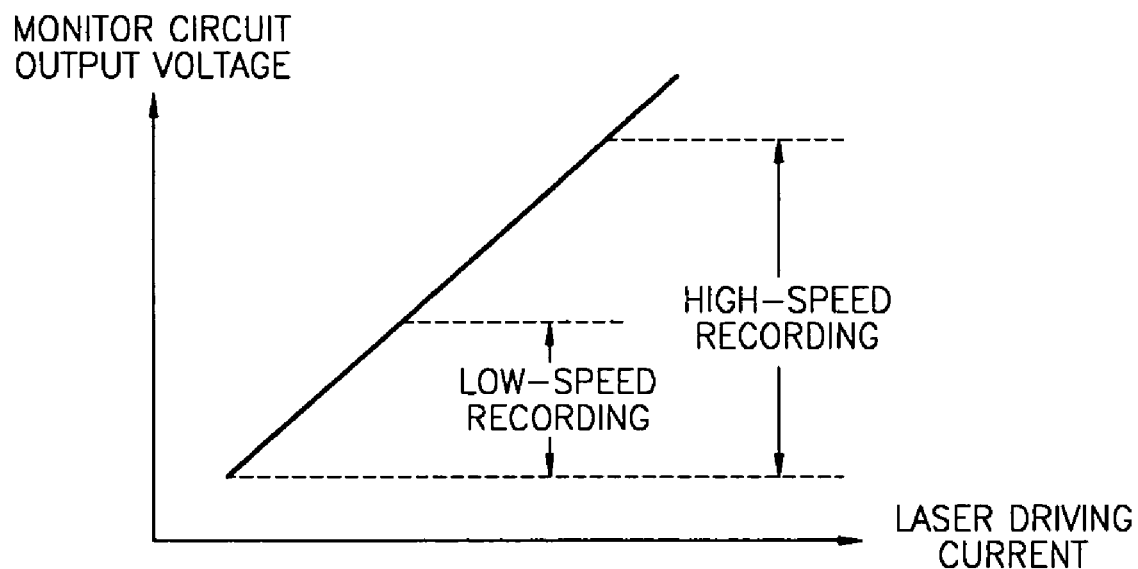
FIG. 3 is a graph illustrating the laser driving current versus monitor circuit output voltage in the conventional laser power control apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
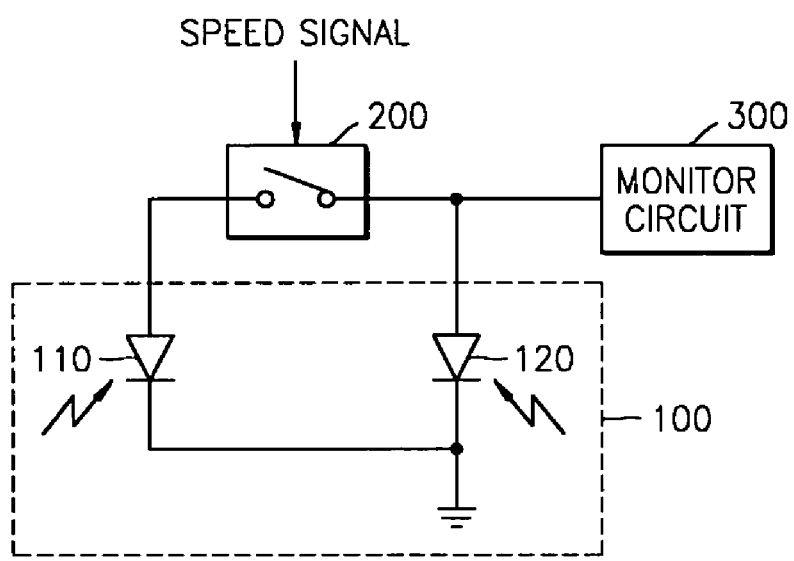
FIG. 4 is a block diagram of a laser power monitor device according to an embodiment of the present invention.
Figure 5:
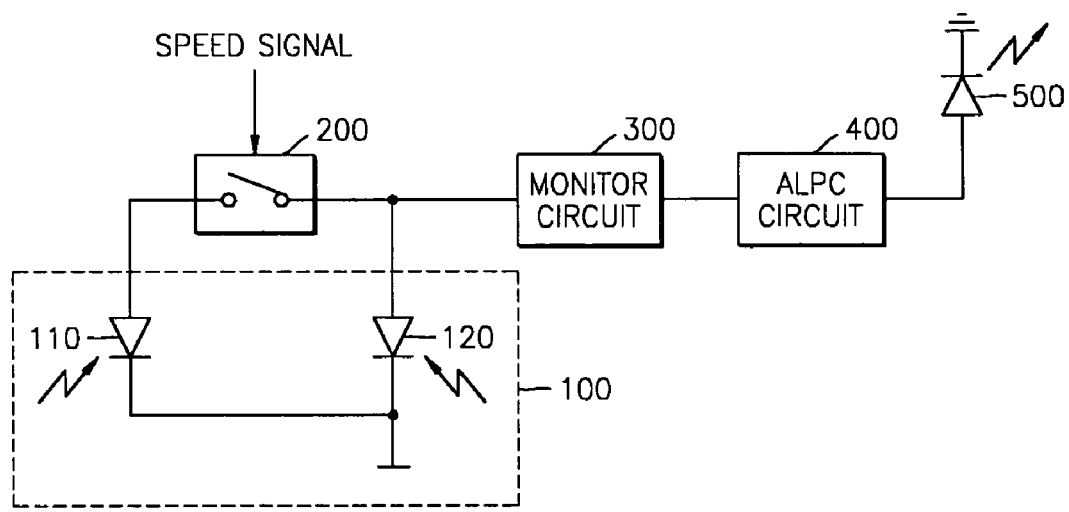
FIG. 5 is a block diagram of a laser power control apparatus including the laser power monitor device of FIG. 4.

FIG. 4 is a block diagram of a laser power monitor device according to an embodiment of the present invention. FIG. 5 is a block diagram of a laser power control apparatus including the laser power monitor device of FIG. 4.

Figure 6:
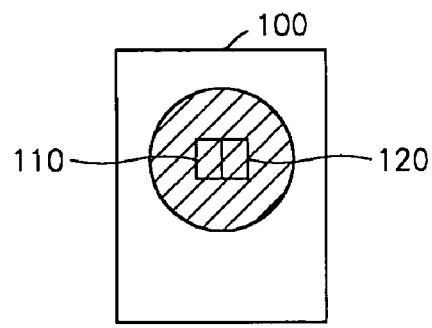
FIG. 6 is a front view of a photo diode unit according to an embodiment of the present invention.

As shown in FIGS. 4 and 5, the laser power monitor device according to the present invention includes a photo diode unit 100 and a monitor circuit 300. The photo diode unit 100 includes a plurality of photo diodes 110 and 120. FIG. 6 is a front view of the photo diode unit 100 according to the present invention. In this case, the photo diode unit 100 includes two photo diodes 110 and 120, wherein a laser beam lights a wider range than the space occupied by the plurality of photo diodes 110 and 120. If a plurality of photo diodes 110 and 120 are used instead of a conventional large photo diode 10, the frequency characteristic related to the photo diode improves and the current input into the monitor circuit 300 follows a variation in optical power of laser incident on the photo diode unit 100 more exactly. Thus, the precision of laser power control can be improved.

Preferably, a switch unit 200 is installed between the photo diode unit 100 and the monitor circuit 300. The switch unit 200 receives a current recording speed signal and switches so that output current from the photo diodes 110 and 120 is added and inputted into the monitor circuit 300 when the recording speed is low, and only output current from one photo diode 120 is inputted into the monitor circuit 300 during high speed recording.

As a result, larger current is outputted to the monitor circuit 300 at low recording speeds, the variation range of the voltage output from the monitor circuit 300 is sufficiently large, and the laser power control performed in an ALPC circuit 400 is more precise.

Figure 7:
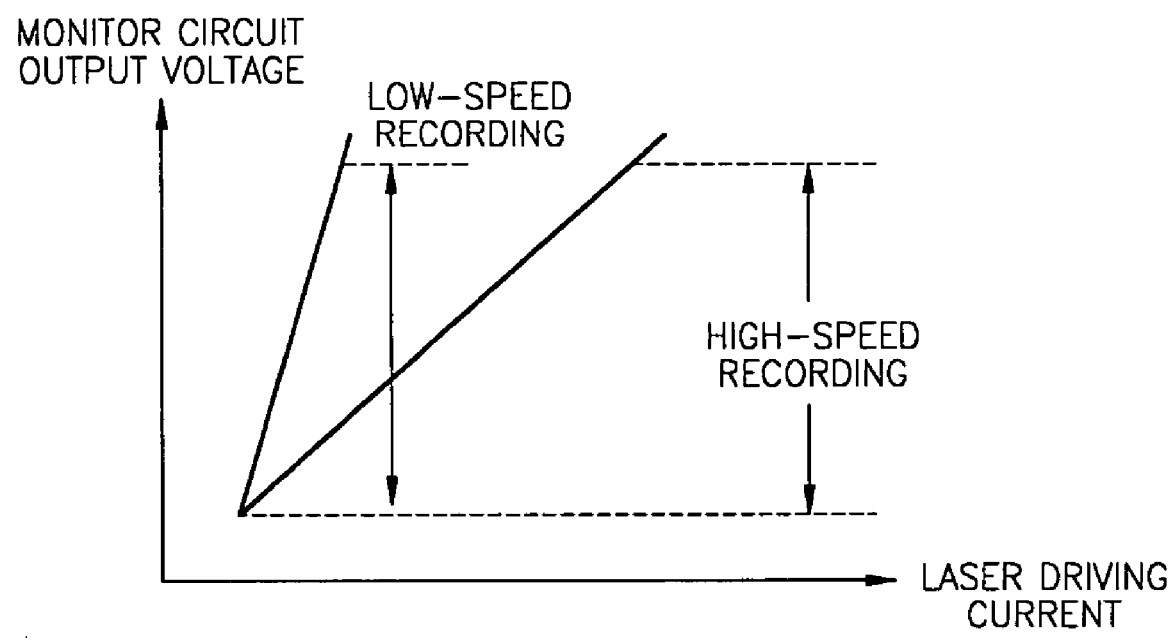
FIG. 7 is a graph of laser driving current versus monitor circuit output voltage both when high-speed recording and low-speed recording is performed, according to an embodiment of the present invention.

FIG. 7 is an illustration of laser driving current versus monitor circuit output voltage, both when high-speed recording and low-speed recording is performed, according to the present invention. When the above-described laser power control apparatus is used, the ALPC circuit 400 tabulates and stores the relation between the laser diode driving current used to drive a laser diode 500 and the monitor circuit output voltage through a power calibration process during an initial operation of the optical recording and/or reproducing apparatus, both at high speed and low speed. When recording is performed, a difference between the output voltage of the monitor circuit 300 and a predetermined reference voltage is measured, and in order to compensate the difference, the laser diode driving current is increased or decreased based on the table corresponding to the appropriate speed.

As shown in FIG. 7, in the present invention, the variation range of the monitor circuit output voltage, even when low-speed recording is performed, is sufficiently wide and is similar to the variation range of the monitor circuit output voltage when high-speed recording is performed. On the other hand, the slope of the line indicating the relation between the laser diode driving current and the monitor circuit output voltage when low-sped recording is performed is not the same, but steeper, than the slope of the straight line when high-speed recording is performed.

As such, the variation range of the voltage inputted into the ALPC circuit 400 is large. Thus, a variation in optical power is more accurately reflected in a variation in voltage. As such, more precise control of optical power can be performed.

The structure by which the laser power monitor device is connected to other elements in the optical pickup and the optical recording and/or reproducing apparatus is similar to that of the conventional laser power monitor device. Thus, the optical pickup including the laser power monitor device and the optical recording and/or reproducing apparatus including the optical pickup are further claimed.

As described above, in the laser power monitor device having the above structure, the frequency characteristic of current input into a monitor circuit is improved, and more precise power control can be performed. In addition, the variation range of a voltage output from the monitor circuit is sufficiently large even at low speed recording, thereby increasing the precision of power control in this case.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A laser power monitor device for an optical recording and/or reproducing apparatus having a laser diode and an automatic laser power control circuit, the laser power monitor device comprising:
   a photo diode unit to receive part of a light emitted from the laser diode and output a current proportional to optical power;
   a monitor circuit, to receive the current output from the photo diode unit, convert the received current into a voltage, and output the voltage to the automatic laser power control circuit, wherein the photo diode unit includes a plurality of photo diodes connected to the monitor circuit to supply current to the monitor circuit; and
   a switch unit that is installed between the photo diode unit and the monitor circuit,
   wherein the switch unit receives a signal on a current recording speed and switches to reduce the number of photo diodes supplying current to the monitor circuit as the recording speed is increased.

2. A laser power monitor device for an optical recording and/or reproducing apparatus having a laser diode; an automatic laser power control circuit; and a laser power monitor device to monitor the laser diode power wherein the laser power monitor device comprises:
   a photo diode unit to receive part of a light emitted from the laser diode and output a current proportional to optical power;
   a monitor circuit to receive a current output from the photo diode unit, convert the received current into a voltage, and output the voltage to the automatic laser power control circuit, wherein the photo diode unit includes a plurality of photo diodes connected to the monitor circuit to supply current to the monitor circuit; and
   a switch unit that receives a signal on a current recording speed and switches to reduce the number of photo diodes supplying current to the monitor circuit when the recording speed is increased.

3. An optical recording and/or reproducing apparatus having an automatic laser power control circuit comprising:
   a laser diode; and
   a laser power monitor device to monitor the laser diode power and to perform optical recording and/or reproducing, wherein the laser power monitor device includes:
      a photo diode unit to receive part of a light emitted from a laser diode and output a current proportional to optical power,
      a monitor circuit to receive the current output from the photo diode unit, convert the received current into a voltage and output the voltage to the automatic laser power control circuit, wherein the photo diode unit includes a plurality of photo diodes connected to the monitor circuit to supply current to the monitor circuit, and
      a switch unit that is installed between the photo diode unit and the monitor circuit,
      wherein the switch unit receives a signal on a current recording speed and switches to reduce the number of photo diodes supplying current to the monitor circuit when the recording speed is increased.

4. A laser power monitor device for an optical recording and/or reproducing apparatus having a laser diode and an automatic laser power control circuit, the laser power monitor device comprising:
   a photo diode unit having at least two photo diodes to receive a light emitted from the laser diode and to output a current;
   a monitor circuit to receive the current output from at least one photo diode in the photo diode unit and to convert the current output into a voltage corresponding to a power of the laser diode in order to output a laser diode driving current;
   a switching unit connecting the photodiode unit to the monitor circuit, wherein
      the switching unit switches to enable all of the at least two photo diodes in the photo diode unit to output the current to the monitor circuit during a first speed recording operation; and
      the switching unit switches to enable a number of the at least two photo diodes less than all of the at least two photo diodes in the photodiode unit to output the current to the monitor circuit during a second speed recording operation that is faster than the first speed recording operation.

5. The laser power monitor device of claim 4, further comprising an automatic laser power control circuit that is connected between the laser diode and the monitor circuit to receive an output voltage from the monitor circuit, compensate a difference between the output voltage and a predetermined reference voltage, and output the laser diode driving current to the laser diode.

6. The laser power monitor device of claim 4, wherein the photo diode unit comprises a first photo diode and a second photo diode to receive the light emitted from the laser diode and to output the current to the monitor circuit.

7. The photo diode unit of claim 6, wherein both the first photo diode and the second photo diode output the current to the monitor circuit during the first speed recording operation.

8. The photo diode unit of claim 6, wherein either the first photo diode or the second photo diode output the current to the monitor circuit during the second speed recording operation.

9. The laser power monitor device of claim 7, wherein the first speed recording operation is a low speed recording operation.

10. The laser power monitor device of claim 8, wherein the second speed recording operation is a recording operation performed at a maximum recording speed.

* * * * *

UNITED STATES PATENT AND TRADEMARK OFFICE
CERTIFICATE OF CORRECTION

PATENT NO.        : 7,272,103 B2                                      Page 1 of 1
APPLICATION NO.   : 10/751647
DATED             : September 18, 2007
INVENTOR(S)       : Sung-du Kwon et al.

It is certified that error appears in the above-identified patent and that said Letters Patent is hereby corrected as shown below:

Title Page, Column 2 (U.S. Patent Documents), Line 4, change "6,734,793 B1" to --6,724,793 B2--.

Signed and Sealed this

Eleventh Day of March, 2008

JON W. DUDAS
*Director of the United States Patent and Trademark Office*